(12) United States Patent
Sun et al.

(10) Patent No.: US 7,924,887 B2
(45) Date of Patent: Apr. 12, 2011

(54) METHOD AND DEVICE FOR IMPROVING CLOCK STABILITY

(75) Inventors: Wenhua Sun, Shenzhen (CN); Xiaobo Wang, Shenzhen (CN); Jihui Wang, Shenzhen (CN); Wenguang Xu, Shenzhen (CN); Shengbing Yang, Shenzhen (CN); Youhao Deng, Shenzhen (CN); Bingbo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/938,123

(22) Filed: Nov. 2, 2010

(65) Prior Publication Data

US 2011/0058576 A1 Mar. 10, 2011

Related U.S. Application Data

(63) Continuation of application No. 12/501,861, filed on Jul. 13, 2009.

(30) Foreign Application Priority Data

Sep. 12, 2008 (CN) .......................... 2008 1 0211970
Apr. 27, 2009 (WO) ................. PCT/CN2009/071506

(51) Int. Cl.
*H04J 3/06* (2006.01)
(52) U.S. Cl. ..................................... 370/503
(58) Field of Classification Search .......... 370/503–520, 370/276–278, 282; 709/227–232, 248; 455/502
See application file for complete search history.

(56) References Cited

U.S. PATENT DOCUMENTS

| 6,819,685 | B1 * | 11/2004 | Abouchakra et al. | 370/519 |
| 7,020,791 | B1 * | 3/2006 | Aweya et al. | 713/400 |
| 7,079,554 | B2 * | 7/2006 | Peled | 370/514 |
| 7,106,823 | B2 * | 9/2006 | Miller et al. | 375/376 |
| 7,191,355 | B1 | 3/2007 | Ouellette et al. | |
| 7,289,538 | B1 | 10/2007 | Paradise et al. | |
| 7,411,970 | B2 | 8/2008 | Scott et al. | |
| 7,415,044 | B2 * | 8/2008 | Kallstenius | 370/516 |

(Continued)

FOREIGN PATENT DOCUMENTS

CN 1496072 A 5/2004

(Continued)

OTHER PUBLICATIONS

International Search Report in corresponding PCT Application No. PCT/CN2009/071506 (Apr. 27, 2009).
Extended European Search Report in corresponding European Application No. 09165310.5 (Oct. 20, 2009).

*Primary Examiner* — Dmitry H Levitan
(74) *Attorney, Agent, or Firm* — Leydig, Voit & Mayer, Ltd.

(57) ABSTRACT

A method and device for improving clock stability are provided. The method includes: determining whether a difference between a current sender timestamp (ST) and a current receiver timestamp (RT) is a mutated value; pre-processing the ST and RT, if the difference between the ST and RT is a mutated value; acquiring a service clock according to the pre-processed ST and RT; and sending time division multiplex (TDM) data according to the service clock. Through the embodiments of the present disclosure, a packet delay variance (PDV) may be smoothed, the impairment of the PDV on clock recovery may be reduced, the quality of the clock recovery may be improved, and the problem of clock synchronization may be solved through the mutation processing on the timestamps.

16 Claims, 7 Drawing Sheets

U.S. PATENT DOCUMENTS

| | | | |
|---|---|---|---|
| 7,474,624 B2 * | 1/2009 | Grossman | 370/252 |
| 7,711,009 B2 * | 5/2010 | Kataria et al. | 370/503 |
| 7,817,673 B2 * | 10/2010 | Scott et al. | 370/503 |
| 2006/0233203 A1 * | 10/2006 | Iwamura | 370/516 |
| 2007/0104228 A1 | 5/2007 | Cohen et al. | |
| 2007/0223459 A1 * | 9/2007 | Crowle et al. | 370/353 |
| 2010/0067552 A1 * | 3/2010 | Sun et al. | 370/498 |

FOREIGN PATENT DOCUMENTS

| | | |
|---|---|---|
| CN | 1551556 A | 12/2004 |
| CN | 1581845 A | 2/2005 |
| EP | 1394975 A2 | 8/2003 |

* cited by examiner

METHOD AND DEVICE FOR IMPROVING CLOCK STABILITY

CROSS-REFERENCE TO RELATED APPLICATIONS

This application is a continuation of U.S. patent application Ser. No. 12/501,861, filed on Jul. 13, 2009, which claims priority to Chinese Patent Application No. 200810211970.0, filed on Sep. 12, 2008, and International Patent Application No. PCT/CN2009/071506, filed on Apr. 27, 2009, all of which are hereby incorporated by reference in their entireties.

FIELD OF THE TECHNOLOGY

The present disclosure relates to communication technologies, and more particularly to a method and device for improving clock stability.

BACKGROUND OF THE DISCLOSURE

In Circuit Emulation Services over Packet (CESoP), it is a key factor that influences the system performance to accurately recover a time division multiplex (TDM) service clock. For example, if a dedicated leased line is used between two clients connected by a circuit emulation service channel of the operator, clock frequencies of TDM services of the clients must be recovered precisely at the egress of the packet-based network. Otherwise, long-time frequency mismatch will result in overflow or read-empty of waiting queue at the egress of the packet-based network and cause slip impairment.

Figure 1:
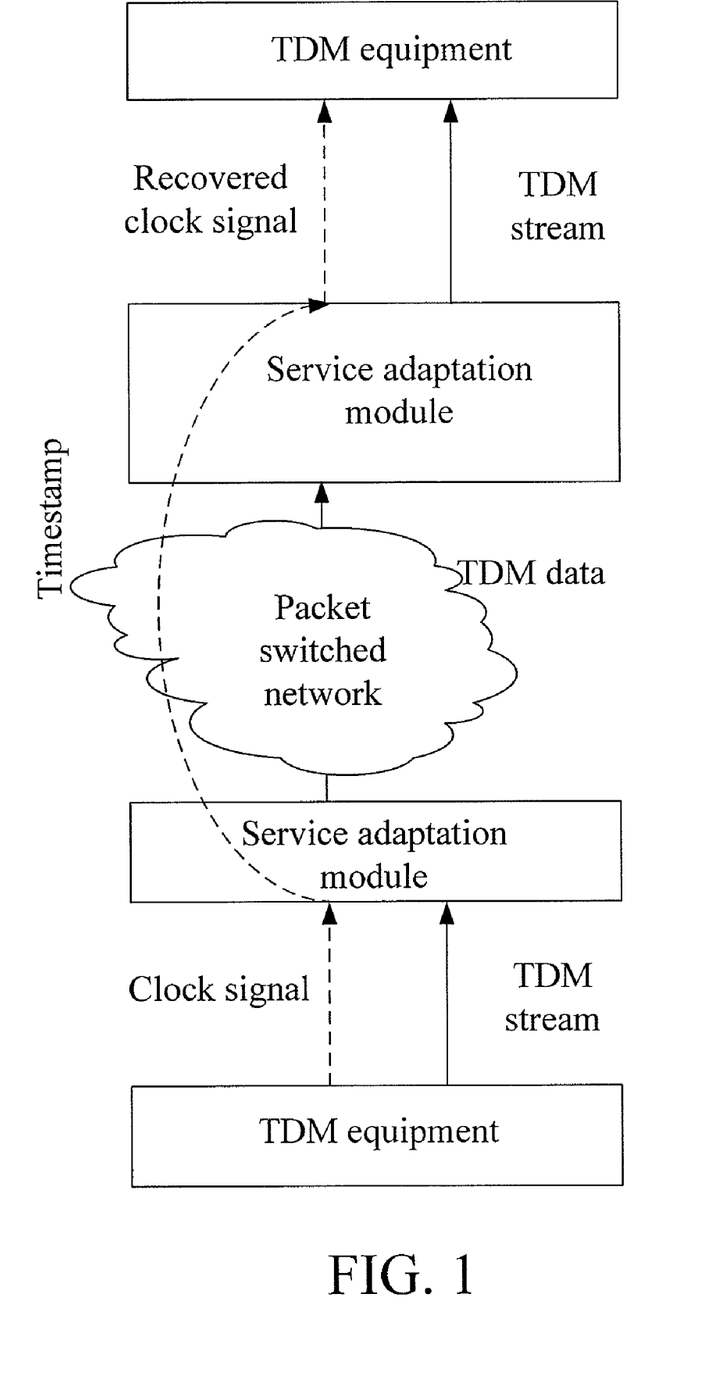
FIG. 1 is a flow chart of adaptive clock recovery.

An adaptive approach is a common method for recovering clock, in which a receiving end extracts timing information from timestamps carried in packets and a packet arrival interval. This approach needs no extra reference clock, and is very suitable for use in a packet-based network. The process for adaptive clock recovery is shown in FIG. 1. In FIG. 1, the function of service adaptation modules is to complete adaptation between a TDM stream and packets. The service adaptation module at a sending end obtains a clock signal from TDM device to drive a counter to count, encapsulates and sends data in packets when receiving a certain amount of TDM stream data, and meanwhile loads a counter value when the packets are sent, that is, a timestamp into a packet header. The service adaptation module at a receiving end receives the packets, uses the timestamp to recover a service clock at the sending end, and utilizes the clock to send the TDM data in the packet load in the form of a bit stream.

The clock recovery needs both timestamps at the packet sending and reception, which inevitably introduces packet delay characteristics of the packet-based network. The key of the adaptive approach lies in how to effectively filter out the impairment of a packet delay variance (PDV) on the clock recovery so as to precisely recover the clock signal at the sending end.

The prior art provides a method for reducing the impairment of the PDV on the clock recovery. The method is as follows: outputting a write signal after performing traffic shaping on a received data packet; determining a data amount buffered in a first-in-first-out buffer according to the write signal and a read clock output by a digital oscillator; computing a filter parameter according to the write signal and the determined buffered data amount; and determining the recovered read clock according to the filter parameter.

In the implementation of the present disclosure, the inventors find that at least the following problems exist in the prior art.

The prior art reduces the impairment of the PDV on the clock recovery mainly by filtering. However, the change of timestamp intervals at the receiving end may be caused by various reasons, so that the filtering method is hardly suitable for different situations. Especially when a certain packet experiences a large delay in the network, a receiver timestamp (RT) is mutated, which seriously impairs the clock recovery.

SUMMARY OF THE DISCLOSURE

The present disclosure is directed to a method and device for improving clock stability, so as to improve the stability of clock recovery.

A method for improving clock stability, comprising:
determining whether a difference between a current sender timestamp, ST, and a current receiver timestamp, RT, is a mutated value;
replacing the difference between the current ST and the current RT with an average difference between ST and the RT, if the difference between the current ST and current RT is a mutated value;
computing a new average difference between ST and the RT according to the replaced difference between the current ST and the current RT; and
acquiring a service clock according to the current ST, the current RT and the new average difference between ST and the RT.

A device for improving clock stability, comprising:
a determining unit, configured to determine whether a difference between a current sender timestamp, ST, and a current receiver timestamp, RT, is a mutated value;
a processing unit, configured to replace difference between the current ST and the current RT with an average difference between ST and the RT if the difference between the current ST and current RT is a mutated value;
the processing unit comprises:
a difference replacing subunit, configured to replace the difference between the current ST and the current RT by the average difference between ST and the RT stored in the detecting subunit when the determination result from the determining subunit is that the difference between the current ST and the current RT is a mutated value;
an average difference subunit, configured to compute an average difference between ST and the RT according to the difference between the current ST and the current RT replaced by the difference replacing subunit and update the average difference between ST and the RT stored in the detecting subunit when the determination result from the determining subunit is that the difference between the current ST and the current RT is a mutated value, or compute an average difference between the current ST and the current RT and update the average difference between the current ST and the current RT stored in the detecting subunit when the determination result from the determining subunit is that the difference between the current ST and the current RT is not a mutated value; and
a service clock acquiring unit, configured to acquire a service clock according to the current ST, the current RT and the average difference between ST and the RT from the processing unit.

A computer-readable medium, having computer usable instructions stored thereon for execution by a processor to perform a method for improving clock stability, comprising:

determining whether a difference between a current sender timestamp, ST, and a current receiver timestamp, RT, is a mutated value;

replacing the difference between the current ST and the current RT with an average difference between ST and the RT, if the difference between the ST and RT is a mutated value;

computing a new average difference between ST and the RT according to the replaced difference between the current ST and the current RT; and acquiring a service clock according to the current ST, the current RT and the new average difference between ST and the RT.

In the embodiments of the present disclosure, a PDV may be smoothed, the impairment of the PDV on the clock recovery may be reduced, the quality of the clock recovery may be improved, and the problem of clock synchronization may be solved through the mutation processing on the timestamps.

BRIEF DESCRIPTION OF THE DRAWINGS

To illustrate the technical solutions according to the embodiments of the present disclosure more clearly, the accompanying figures for describing the embodiments are introduced briefly in the following. Apparently, the accompanying drawings in the following description are some embodiments of the present disclosure; persons of ordinary skill in the art can derive other drawings according to the accompanying drawings without paying any creative efforts.

DETAILED DESCRIPTION OF THE EMBODIMENTS

The embodiments of the present disclosure will be clearly and fully described below with reference to the accompanying drawings. It is obvious that the embodiments to be described are only a part rather than all of the embodiments of the present disclosure. All other embodiments derived by those skilled in the art based on the embodiments of the present disclosure described herein without paying any creative efforts fall within the scope of the present disclosure.

Figure 2:
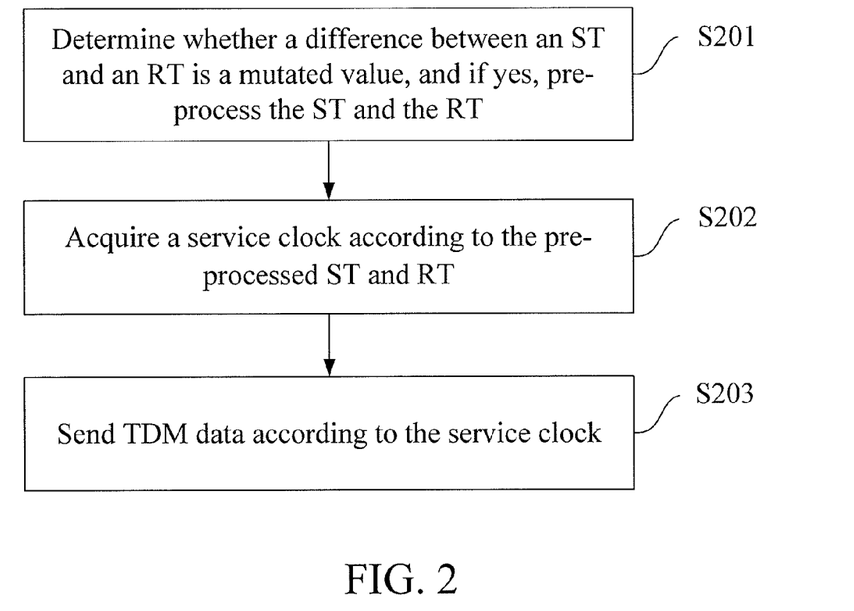
FIG. 2 is a flow chart of a method for improving clock stability according to a first embodiment of the present disclosure.

An embodiment of the present disclosure provides a method for improving clock stability, which may recover a service clock through an adaptive approach. As shown in FIG. 2, the method includes the following blocks.

In Block s201, it is determined whether a difference between a current sender timestamp (ST) and a current receiver timestamp (RT) is a mutated value, and if yes, the ST and the RT are pre-processed.

The process for determining whether the difference between the current ST and the current RT (receiver/sender timestamp difference) is a mutated value is as follows. An amplitude of a difference between a current receiver/sender timestamp difference and an average receiver/sender timestamp difference is compared with a predetermined range to determine whether the amplitude exceeds the predetermined range, and if yes, it is detected whether amplitudes of differences between subsequent N receiver/sender timestamp differences and the average receiver/sender timestamp difference exceed the range. Here, N is a variable and can be flexibly configured according to demands of the algorithm. If the amplitudes of differences between the subsequent N receiver/sender timestamp differences and the average receiver/sender timestamp difference do not exceed the predetermined range, the current receiver/sender timestamp difference is a mutated value. If the amplitude of the difference between the current receiver/sender timestamp difference and the average receiver/sender timestamp difference does not exceed the predetermined range, the current receiver/sender timestamp difference is a non-mutated value. Or, if the amplitude of the difference between the current receiver/sender timestamp difference and the average receiver/sender timestamp difference exceeds the predetermined range, and the amplitudes of differences between the subsequent N receiver/sender timestamp differences and the average receiver/sender timestamp difference also exceed the predetermined range, the current receiver/sender timestamp difference is a non-mutated value.

The physical meaning of the receiver/sender timestamp difference (RT−ST) is a sum of an actual transmission delay (Delay) of a corresponding packet and an offset between clocks at receiving and sending ends (offset).

$$\Delta T = RT - ST = \text{Delay} + \text{offset}$$

The change of either of the transmission delay (Delay) and the clock offset (offset) will result in the change of the timestamp difference. The possible reasons for the change of $\Delta T$ may be one or more of the following:

1) A queuing delay change caused by a change of the service load;

2) A retransmission delay change caused by multiple retransmissions in a Carrier Sense Multiple Access/Collision Detect (CSMA/CD) method;

3) A change of a packet transmission path; and

4) An adjustment of the execution time of the clock at the sending end.

Figure 3:
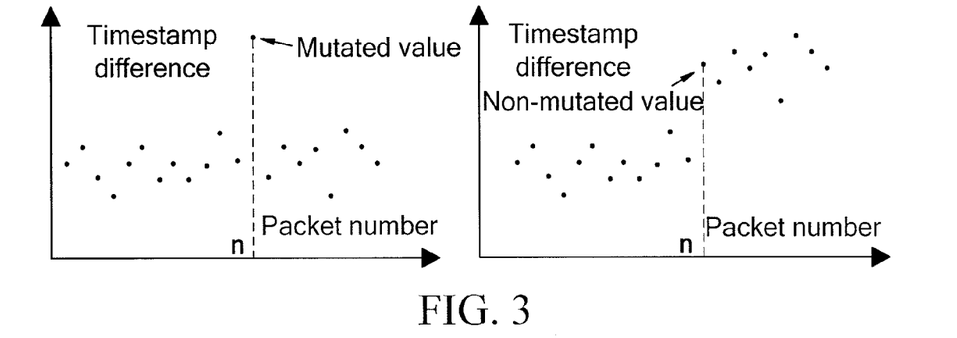
FIG. 3 is a schematic diagram of a mutated value and a non-mutated value of timestamp differences.

The first three cases may result in the change of the packet transmission delay (Delay), while the last case may result in the change of the offset between the clocks at the receiving and sending ends (offset). Among them, only the first two cases may result in a mutation of the timestamp difference. The mutation of the timestamp difference indicates a small part of timestamp differences that seriously depart from the statistical regularity of the large part of timestamp differences among all timestamp differences. As shown in FIG. 3, the timestamp difference of the $n^{th}$ packet in the left diagram is significantly higher than other values, while neighboring values remain substantially unchanged. Therefore, the timestamp difference of the $n^{th}$ packet in the left diagram is a mutated value. The timestamp difference of the $n^{th}$ packet in the right diagram is also an increased value, but the subsequent packets all show the statistical regularity in which the values are increased values. Therefore, the timestamp difference of the $n^{th}$ packet in the right diagram is not a mutated value.

When the difference is a mutated value, the ST and the RT are pre-processed. The pre-processing may be as follows. When the difference between the ST and the RT (receiver/sender timestamp difference) is a mutated value, the current receiver/sender timestamp difference corresponding to the current ST and the current RT is replaced with the average receiver/sender timestamp difference, and a new average receiver/sender timestamp difference is computed according to the replaced current receiver/sender timestamp difference. The pre-processed ST and RT include: the original ST, the original RT, and the new average receiver/sender timestamp difference.

In Block s202, a service clock is acquired according to the pre-processed ST and RT. A phase-locked computation is performed on the pre-processed ST, RT, and average receiver/sender timestamp difference to recover the service clock at the sending end.

In Block s203, TDM data is sent according to the service clock.

In this embodiment of the present disclosure, a packet delay variance (PDV) is smoothed, the impairment of the PDV on the clock recovery is reduced, the quality of the clock recovery is improved, and the problem of clock synchronization is solved through the mutation processing on the timestamps.

Figure 4:
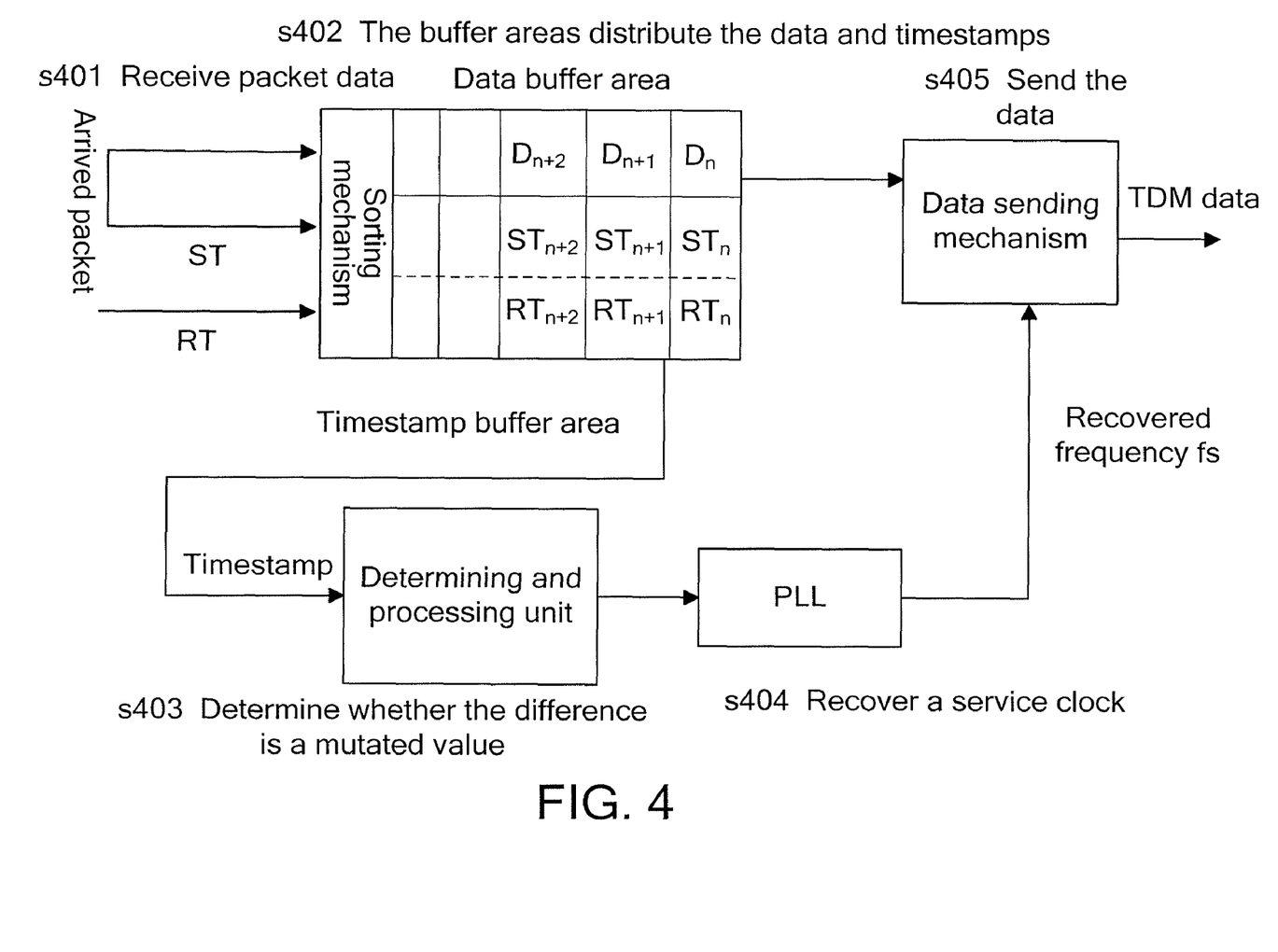
FIG. 4 is a flow chart of a method for improving clock stability according to a second embodiment of the present disclosure

An embodiment, the present disclosure provides a method for improving clock stability, and the application background thereof is to recover a service clock by a self-adaptive method. As shown in FIG. 4, the method includes the following blocks.

In Block s401, packet data is received, a current RT is recorded, and TDM data and STs (more than one ST) are separated from the packet data. The TDM data, the STs, and the RTs (more than one RT) are respectively stored in order from small to large STs, with one to one correspondence maintained among the TDM data, the STs, and the RTs. The STs, the RTs, and the TDM data are correspondingly stored in a timestamp buffer area and a data buffer area at the receiving end.

In Block s402, a data sending mechanism reads TDM data of a current packet from the data buffer area while finishing sending a previous data packet, and meanwhile, the timestamp buffer area sends the corresponding ST and RT to a determining and processing unit.

In Block s403, a mutated value of a difference between the current ST and the current RT is detected and repaired. It is determined whether the current difference between the ST and the RT is a mutated value, and if yes, the ST and the RT are pre-processed. An amplitude of a difference between a current receiver/sender timestamp difference and an average receiver/sender timestamp difference is compared with a predetermined range to determine whether the amplitude exceeds the predetermined range, and if yes, it is detected whether amplitudes of differences between subsequent N timestamp differences and the average receiver/sender timestamp difference exceed the predetermined range. If the amplitudes of differences between the subsequent N timestamp differences and the average receiver/sender timestamp difference do not exceed the predetermined range, the current receiver/sender timestamp difference is a mutated value. If the amplitude of the difference between the current receiver/sender timestamp difference and the average receiver/sender timestamp difference is within the predetermined range, or if the amplitude of the difference between the current receiver/sender timestamp difference and the average receiver/sender timestamp difference is not within the predetermined range, but the amplitudes of differences between the subsequent N timestamp differences and the average receiver/sender timestamp difference all exceed the predetermined range, the current receiver/sender timestamp difference is a non-mutated value. An average timestamp difference is computed according to a determination result.

In Block s404, a service clock is acquired according to the pre-processed ST and RT. A phase locked loop (PLL) receives the pre-processed timestamps, including the STs, the RTs, and the average receiver/sender timestamp difference, determines an amplitude of a frequency difference or phase difference between an output clock signal and a received clock signal according to the pre-processed ST and RT received, performs smooth filtering on the frequency difference or phase difference between the output clock signal and the received clock signal to filter out the influence of data change and other unstable factors on the whole module, performs an inversed phase modulation on the frequency or phase of the output clock signal according to the frequency difference or phase difference after smooth filtering, fixates the amplitude of the frequency difference or phase difference between the output clock signal and the received clock signal, and recovers the service clock at the sending end.

In Block s405, the data sending mechanism receives the service clock at the sending end recovered by the PLL, and is driven to push out a TDM bit stream according to the service clock.

Figure 5A:
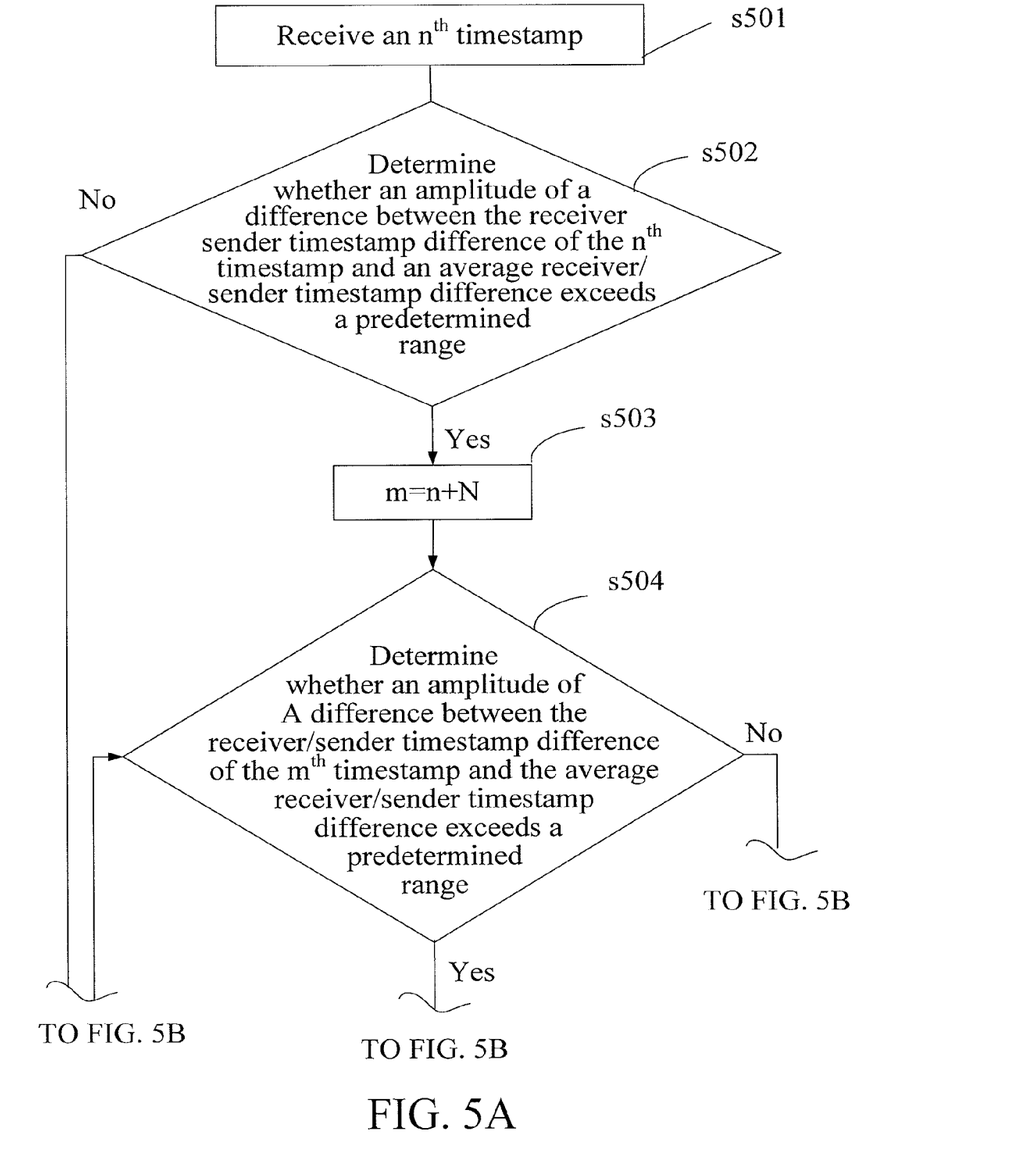
FIG. 5 is a flow chart of a method for detecting and repairing a mutated value according to an embodiment of the present disclosure.
Figure 5B:
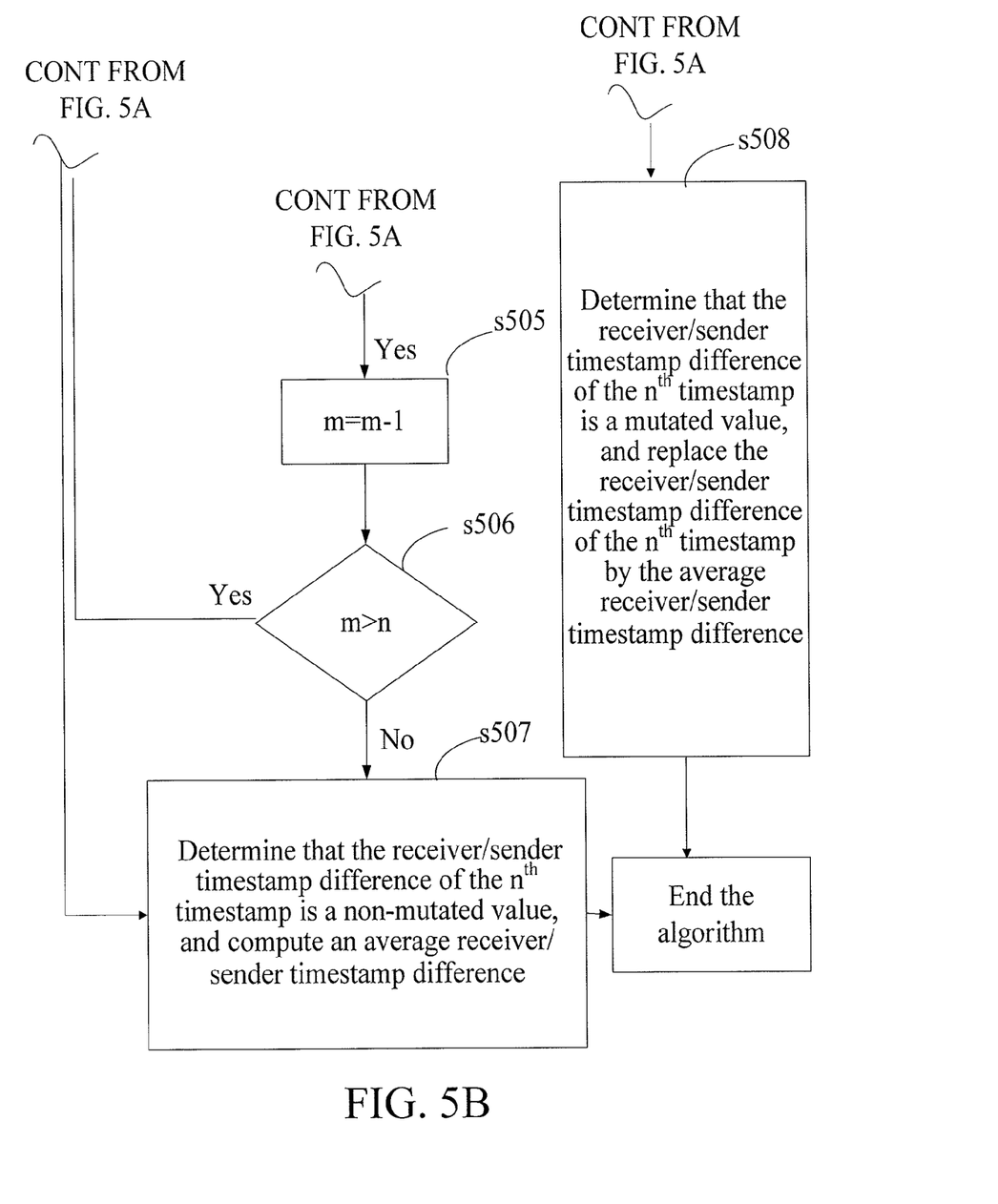

The method for detecting and repairing a mutated value in Block s403 is shown in FIG. 5, and includes the following blocks.

In Block s501, an $n^{th}$ packet timestamp pair including an ST and an RT is received and detected, and a receiver/sender timestamp difference $\Delta T_n$ of the $n^{th}$ packet timestamp pair is computed.

In Block s502, it is determined whether an amplitude of a difference between the receiver/sender timestamp difference $\Delta T_n$ of the $n^{th}$ packet timestamp pair and an average receiver/sender timestamp difference $\Delta T_{average}$ exceeds a predetermined range, and if yes, Block s503 is performed; otherwise, Block s507 is performed.

In Block s503, an $m^{th}$ (m=n+N) packet timestamp pair is detected, and a receiver/sender timestamp difference $\Delta T_m$ of the $m^{th}$ packet timestamp pair is computed.

In Block s504, it is determined whether an amplitude of a difference between the receiver/sender timestamp difference $\Delta T_m$ of the $m^{th}$ packet timestamp pair and the average receiver/sender timestamp difference $\Delta T_{average}$ exceeds a predetermined range, and if yes, Block s505 is performed; otherwise, Block s508 is performed.

In Block s505, an $m^{th}$ (m=m−1) packet timestamp pair is detected.

In Block s506, it is determined whether m is greater than n, and if yes, Block s504 is performed to compute the receiver/sender timestamp difference $\Delta T_m$ of the $m^{th}$ packet timestamp pair; otherwise, Block s507 is performed.

In Block s507, it is determined that the receiver/sender timestamp difference $\Delta T_n$ of the $n^{th}$ packet timestamp pair is a non-mutated value, and an average receiver/sender timestamp difference is computed.

In Blocks s508, it is determined that the receiver/sender timestamp difference $\Delta T_n$ of the $n^{th}$ packet timestamp pair is a mutated value, and the receiver/sender timestamp difference $\Delta T_n$ of the $n^{th}$ packet timestamp pair is replaced by the average receiver/sender timestamp difference.

The method for improving clock stability according to the second embodiment of the present disclosure may smooth a PDV, reduce the impairment of the PDV on the clock recovery, improve the quality of the clock recovery, and solve the problem of clock synchronization by detecting mutated values of packets and performing a mutation processing on the timestamps.

Figure 6:
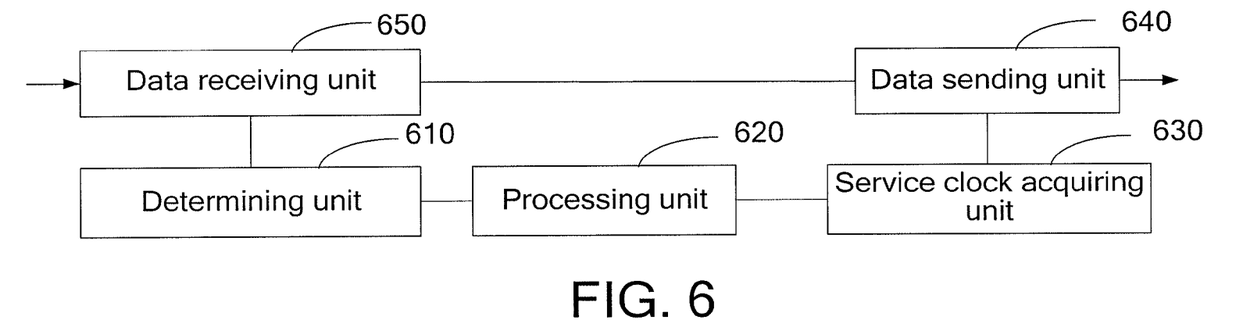
FIG. 6 is a structural diagram of an device for improving clock stability according to an embodiment of the present disclosure.

In an embodiment, the present disclosure further provides a device for improving clock stability. As shown in FIG. 6, the device includes a determining unit 610, a processing unit 620, a service clock acquiring unit 630, and a data sending unit 640.

The determining unit 610 is configured to analyze timestamps from a buffer area, and determine whether an amplitude of a difference between a difference between a current ST and a current RT and an average receiver/sender timestamp difference exceeds a predetermined range, and if yes, detect whether amplitudes of differences between subsequent N receiver/sender timestamp differences and the average receiver/sender timestamp difference exceed the predetermined range. If the amplitudes of differences between the subsequent N receiver/sender timestamp differences and the average receiver/sender timestamp difference do not exceed the predetermined range, the difference between the ST and the RT is a mutated value. If the amplitude of the difference between the current receiver/sender timestamp difference and the average receiver/sender timestamp difference does not exceed the predetermined range or if the amplitude of the difference between the current receiver/sender timestamp difference and the average receiver/sender timestamp difference exceeds the predetermined range, but the amplitudes of differences between the subsequent N receiver/sender timestamp differences and the average receiver/sender timestamp difference all exceed the predetermined range, the current receiver/sender timestamp difference is a non-mutated value.

The processing unit 620 is configured to pre-process the current ST and the current RT according to a determination result from the determining unit 610, compute an average receiver/sender timestamp difference, and update the original average receiver/sender timestamp difference.

The service clock acquiring unit 630 is configured to compute the pre-processed ST, RT, and average receiver/sender timestamp difference, and recover a service clock at the sending end. The pre-processed ST and RT are involved in a phase-locked computation so as to recover the service clock at the sending end. The service clock acquiring unit 630 is configured to receive the timestamps, including the ST, the RT, and the average receiver/sender timestamp difference; determine an amplitude of a frequency difference or phase difference between an output clock signal and a received clock signal according to the pre-processed timestamps received after the mutated value pre-processing; perform smooth filtering on the frequency difference or phase difference between the output clock signal and the received clock signal to filter out the influence of data change and other unstable factors on the whole module; perform an inversed phase modulation on the frequency or phase of the output clock signal according to the output frequency difference or phase difference; fixate the amplitude of the frequency difference or phase difference between the output clock signal and the received clock signal, and recover the service clock at the sending end.

The data sending unit 640 is configured to send a TDM bit stream according to the clock signal recovered by the service clock acquiring unit 630.

Figure 7:
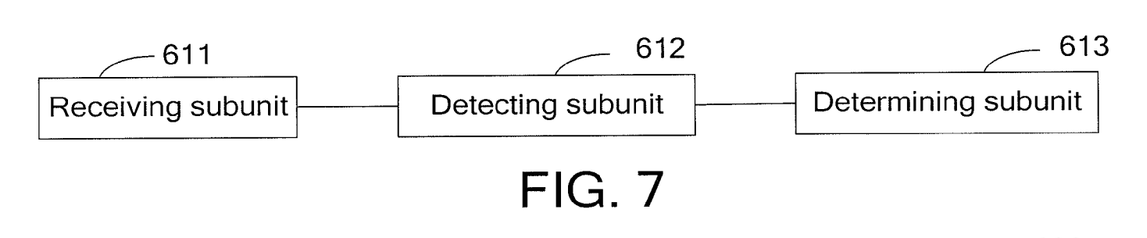
FIG. 7 is a structural diagram of a determining unit according to an embodiment of the present disclosure.

The structure of the determining unit 610 is shown in FIG. 7. The determining unit 610 further includes a receiving subunit 611, a detecting subunit 612, and a determining subunit 613.

The receiving subunit 611 is configured to receive the timestamps including an ST and an RT from a data receiving unit 650.

The detecting subunit 612 is configured to detect whether an amplitude of a difference between a current receiver/sender timestamp difference and an average receiver/sender timestamp difference is within a predetermined range according to the timestamp pair received by the receiving subunit 611 and the average receiver/sender timestamp difference stored in the detecting subunit 612, and send a detection result to the determining subunit 613.

The determining subunit 613 is configured to determine whether the current receiver/sender timestamp difference is a mutated value according to the detection result from the detecting subunit 612.

Figure 8:
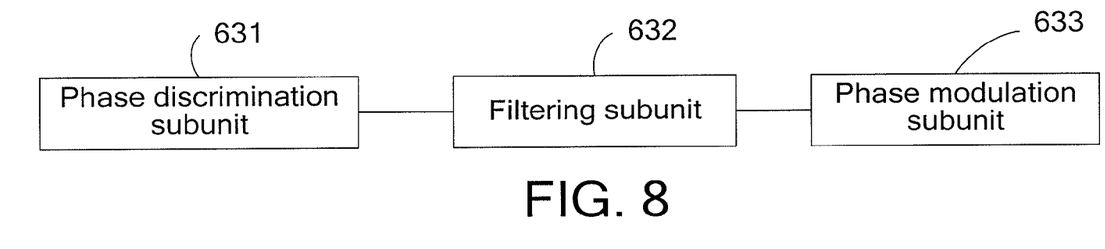
FIG. 8 is a structural diagram of a service clock acquiring unit according to an embodiment of the present disclosure.

The structure of the service clock acquiring unit 630 is shown in FIG. 8. The service clock acquiring unit 630 includes a phase discrimination subunit 631, a filtering subunit 632, and a phase modulation subunit 633.

The phase discrimination subunit 631 is configured to receive the pre-processed timestamps, including the ST, the RT, and the average receiver/sender timestamp difference, and determine an amplitude of a frequency difference or phase difference between an output clock signal and a received clock signal according to the pre-processed timestamps received.

The filtering subunit 632 is configured to perform smooth filtering on the frequency difference or phase difference between the output clock signal and the received clock signal from the phase discrimination subunit 631 to filter out the influence of data change and other unstable factors on the whole module.

The phase modulation subunit 633 is configured to perform an inversed phase modulation on the frequency or phase of the output clock signal according to the frequency difference or phase difference output from the filtering subunit 632, fixate the amplitude of the frequency difference or phase difference between the output clock signal and the received clock signal, and recover the service clock at the sending end.

A device for improving clock stability according to the embodiment of the present disclosure further includes a data receiving unit 650, configured to receive packet data, record RTs, separate TDM data and STs, send the TDM data to the data sending unit 640, and send the STs and the RTs to the determining unit 610. The STs, the RTs, and the TDM data are respectively stored in a timestamp buffer area and a data buffer area correspondingly. The TDM data and the timestamps are stored in order from small to large STs, with one to one correspondence maintained among the TDM data, the STs, and the RTs. The sorting mechanism can effectively reduce the impairment of packet disorder on the clock recovery.

Figure 9:
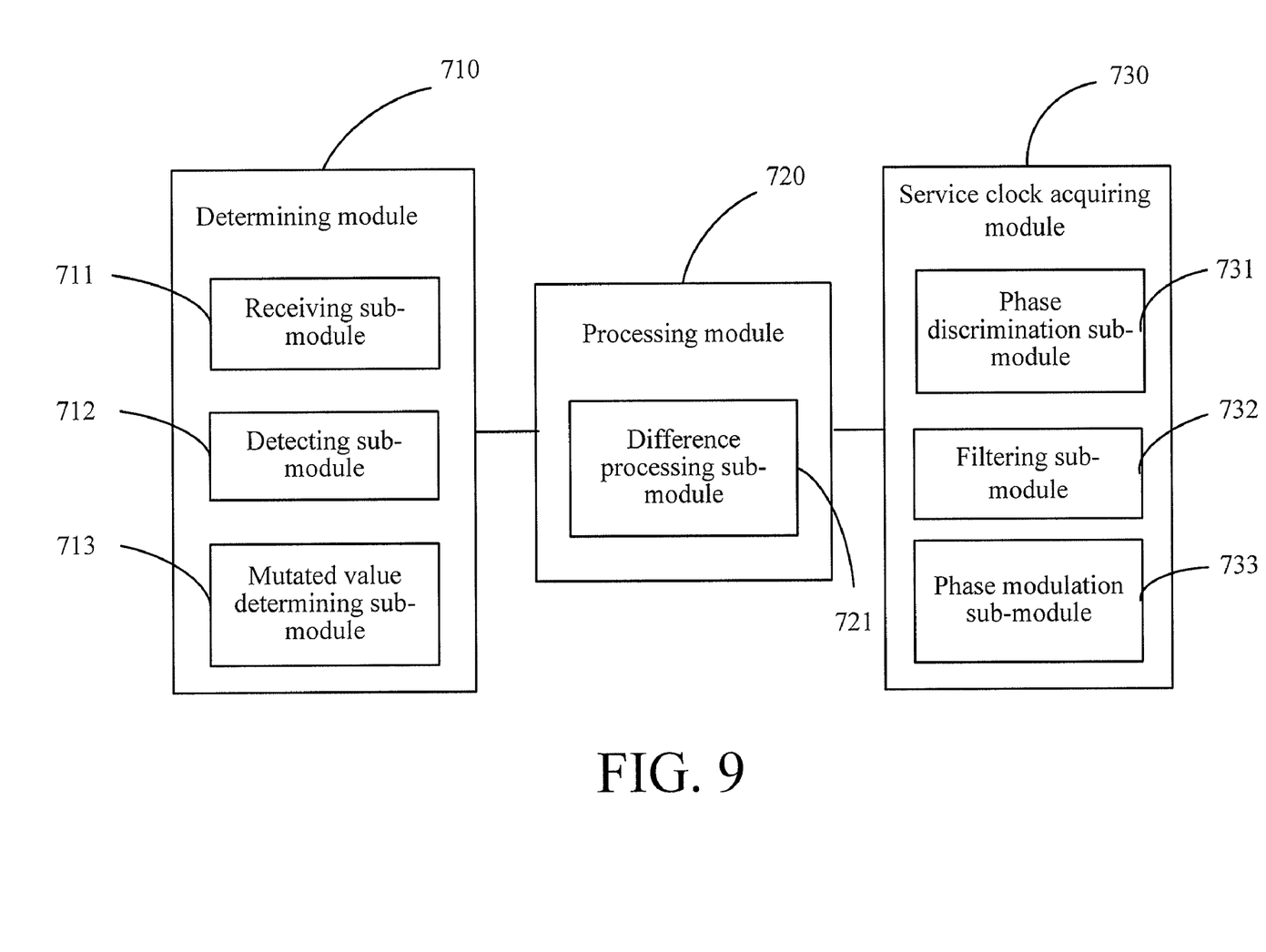
FIG. 9 is a structural diagram of an apparatus for improving clock stability according to an embodiment of the present disclosure.

An embodiment of the present disclosure further provides an apparatus for improving clock stability. As shown in FIG. 9, the apparatus for improving clock stability is connected to a data receiving apparatus and a data sending apparatus. The data sending apparatus is configured to send TDM data received by the data receiving apparatus according to a service clock acquired by the device for improving clock stability. The apparatus for improving clock stability includes a determining module 710, a processing module 720, and a service clock acquiring module 730.

The determining module 710 is configured to determine whether a difference between a current ST and a current RT is a mutated value.

The processing module 720 is configured to pre-process the ST and the RT according to a determination result from the determining module 710.

The service clock acquiring module 730 is configured to acquire the service clock according to the ST and the RT pre-processed by the processing module 720.

The determining module 710 further includes a receiving sub-module 711, a detecting sub-module 712, and a mutated value determining sub-module 713.

The receiving sub-module 711 is configured to receive the ST and the RT from the data receiving apparatus.

The detecting sub-module 712 is configured to detect whether an amplitude of a difference between a current receiver/sender timestamp difference and an average receiver/sender timestamp difference is within a predetermined range according to the ST and the RT received by the receiving sub-module 711 and the average receiver/sender timestamp difference stored in the detecting sub-module 712.

The mutated value determining sub-module 713 is configured to determine whether the current receiver/sender timestamp difference is a mutated value according to a detection result sent by the detecting sub-module 712.

The processing module 720 may further include a difference processing sub-module 721.

The difference processing sub-module 721 is configured to compute an average receiver/sender timestamp difference according to a determination result from the mutated value determining sub-module 713 and update the average receiver/sender timestamp difference stored in the detecting sub-module 712.

Alternatively, the processing module 720 may further include a difference replacing sub-module and an average difference sub-module.

The difference replacing sub-module is configured to replace the current receiver/sender timestamp difference by the average receiver/sender timestamp difference stored in the detecting sub-module 712 when a determination result from the mutated value determining sub-module 713 is that the current receiver/sender timestamp difference is a mutated value.

The average difference sub-module is configured to compute an average receiver/sender timestamp difference according to the current receiver/sender timestamp difference replaced by the difference replacing sub-module and update the average receiver/sender timestamp difference stored in the detecting sub-module 712 when the determination result from the mutated value determining sub-module 713 is that the current receiver/sender timestamp difference is a mutated value, or compute an average receiver/sender timestamp difference and update the average receiver/sender timestamp difference stored in the detecting sub-module 712 when the determination result from the mutated value determining sub-module 713 is that the current receiver/sender timestamp difference is not a mutated value.

The service clock acquiring module 730 further includes a phase discrimination sub-module 731, a filtering sub-module 732, and a phase modulation sub-module 733.

The phase discrimination sub-module 731 is configured to receive the preprocessed timestamps from the processing module 720, and determine an amplitude of a frequency difference or phase difference between an output clock signal and a received clock signal.

The filtering sub-module 732 is configured to perform smooth filtering on the frequency difference or phase difference output from the phase discrimination sub-module 731.

The phase modulation sub-module 733 is configured to perform an inversed phase modulation on the frequency or phase of the output clock signal according to the frequency difference or phase difference output from the filtering sub-module 732, and fixate the amplitude of the frequency difference or phase difference between the output clock signal and the receive clock signal.

The modules mentioned above may be distributed in one or more apparatuses. The modules may be integrated into one module, or be further divided into a plurality of sub-modules.

The apparatus according to the embodiments of the present disclosure may smooth a PDV, reduce the impairment of the PDV on the clock recovery, improve the quality of the clock recovery, and solve the problem of clock synchronization by the performing a mutation processing on the timestamps.

Through the description of the implementations, it is clear to those skilled in the art that the present disclosure may be implemented through hardware, or through software and a necessary universal hardware platform. Based on the above, the technical solutions of the present disclosure may be embodied in the form of a software product. The software product may be stored in a nonvolatile storage media (for example, CD-ROM, USB flash drive, or removable hard disk) and contain several instructions configured to instruct a computer device (for example, a personal computer, a server, or network device) to perform the method according to the embodiments of the present disclosure.

It should be understood by those skilled in the art that the accompanying drawings are schematic views of the preferred embodiments, and modules or processes in the accompanying drawings may not be necessarily required in the implementation of the present disclosure.

It should be understood by those skilled in the art that, modules in a device according to an embodiment may be distributed in the device of the embodiment as described above, or be correspondingly changed to be disposed in one or more devices different from this embodiment. The modules of the embodiments may be integrated into one module, or further divided into a plurality of sub-modules.

The sequence numbers of the embodiments of the present disclosure are merely for the convenience of description, and do not imply the preference among the embodiments.

Several specific embodiments of the present disclosure are described above, and the present disclosure is not limited thereto. Any variations that can be easily thought of by those skilled in the art should fall within the scope of the present disclosure.

What is claimed is:

1. A method for improving clock stability, comprising:
   determining whether a difference between a current sender timestamp (ST) and a current receiver timestamp (RT) is a mutated value, wherein a mutated value occurs when a value for the difference and an average value for the difference exceed a predetermined range but subsequent values of the difference and the average value for the subsequent values of the difference do not exceed the predetermined range;
   replacing the difference between the current ST and the current RT with an average difference between ST and the RT, if the difference between the current ST and current RT is a mutated value;
   computing a new average difference between ST and the RT according to the replaced difference between the current ST and the current RT; and acquiring a service clock according to the current ST, the current RT and the new average difference between ST and the RT.

2. The method of claim 1, further comprising:
receiving packet data, recording the current RT, and separating TDM data and the ST from the packet data.

3. The method of claim 2, wherein the separating TDM data and the ST from the packet data comprises:
storing the TDM data, STs, and RTs in order from small to large STs, with one to one correspondence maintained among the TDM data, the STs, and the RTs.

4. The method of claim 1, wherein the determining whether a difference between the current ST and the current RT is a mutated value comprises:
comparing an amplitude of a difference between the difference between the current ST and the current RT and an average difference between the ST and the RT with a predetermined range to determine whether the amplitude exceeds the predetermined range;
if the amplitude exceeds the predetermined range, detecting whether amplitudes of differences between subsequent N differences between the STs and the RTs and the average difference between the ST and the RT exceed the range; if the amplitudes of differences between the subsequent N differences between the STs and the RTs and the average difference between the ST and the RT do not exceed the predetermined range, determining that the difference between the current ST and the current RT is a mutated value.

5. The method of claim 1, wherein the acquiring a service clock according to the current ST, the current RT and the average difference between the ST and the RT comprises:
determining an amplitude of a frequency difference between an output clock signal and a received clock signal according to the current ST, the current RT and the average difference between the ST and the RT;
performing filtering on the frequency difference between the output clock signal and the received clock signal;
performing an inversed phase modulation on the frequency of the output clock signal according to the frequency difference after the filtering;
locking the amplitude of the frequency difference between the clock signal and the received clock signal; and
recovering the service clock at the sending end.

6. The method of claim 1, wherein the acquiring a service clock according to the current ST, the current RT and the average difference between the ST and the RT comprises:
determining an amplitude of a phase difference between an output clock signal and a received clock signal according to the current ST, the current RT and the average receiver/sender timestamp difference;
performing filtering on the phase difference between the output clock signal and the received clock signal;
performing an inversed phase modulation on the phase of the output clock signal according to the phase difference after the filtering;
locking the amplitude of the phase difference between the clock signal and the received clock signal; and
recovering the service clock at the sending end.

7. The method of claim 1, further comprising:
sending time division multiplex, TDM, data according to the service clock.

8. A device for improving clock stability, comprising:
a determining unit, configured to determine whether a difference between a current sender timestamp (ST) and a current receiver timestamp (RT) is a mutated value, wherein a mutated value occurs when a value for the difference and an average value for the difference exceed a predetermined range but subsequent values of the difference and the average value for the subsequent values of the difference do not exceed the predetermined range;
a processing unit, configured to replace difference between the current ST and the current RT with an average difference between ST and the RT if the difference between the current ST and current RT is a mutated value;
the processing unit comprises:
a difference replacing subunit, configured to replace the difference between the current ST and the current RT by the average difference between ST and the RT stored in the detecting subunit when the determination result from the determining subunit is that the difference between the current ST and the current RT is a mutated value;
an average difference subunit, configured to compute an average difference between ST and the RT according to the difference between the current ST and the current RT replaced by the difference replacing subunit and update the average difference between ST and the RT stored in the detecting subunit when the determination result from the determining subunit is that the difference between the current ST and the current RT is a mutated value, or compute an average difference between the current ST and the current RT and update the average difference between the current ST and the current RT stored in the detecting subunit when the determination result from the determining subunit is that the difference between the current ST and the current RT is not a mutated value; and
a service clock acquiring unit, configured to acquire a service clock according to the current ST, the current RT and the average difference between ST and the RT from the processing unit.

9. The device for improving clock stability of claim 8, wherein the determining unit comprises a receiving subunit, a detecting subunit and a determining subunit;
the receiving subunit is configured to receive current timestamps comprising an ST and an RT;
the detecting subunit is configured to detect whether an amplitude of a difference between a difference between the current ST and the current RT and an average difference between ST and the RT is within a predetermined range according to the ST and the RT received by the receiving subunit and the average difference between ST and the RT stored in the detecting subunit and send a detection result to the determining subunit; and
the determining subunit is configured to determine whether the difference between the current ST and the current RT is a mutated value according to the detection result from the detecting subunit.

10. The device for improving clock stability of claim 8, wherein the service clock acquiring unit comprises:
a phase discrimination subunit, configured to receive the pre-processed timestamps from the processing unit and determine an amplitude of a frequency difference between an output clock signal and a received clock signal according to the pre-processed timestamps received;
a filtering subunit, configured to perform filtering on the frequency difference between the output clock signal and the received clock signal from the phase discrimination subunit; and
a phase modulation subunit, configured to perform an inversed phase modulation on the frequency of the output clock signal according to the frequency difference output from the filtering subunit, and lock the amplitude of the frequency difference between the output clock signal and the received clock signal.

11. The device for improving clock stability of claim 8, wherein the service clock acquiring unit comprises:
a phase discrimination subunit, configured to receive the pre-processed timestamps from the processing unit and determine an amplitude of a phase difference between an output clock signal and a received clock signal according to the pre-processed timestamps received;
a filtering subunit, configured to perform filtering on the phase difference between the output clock signal and the received clock signal from the phase discrimination subunit; and
a phase modulation subunit, configured to perform an inversed phase modulation on the phase of the output clock signal according to the phase difference output from the filtering subunit, and lock the amplitude of the phase difference between the output clock signal and the received clock signal.

12. The device for improving clock stability of claim 8, further comprising a data receiving unit and a data sending unit, wherein:
the data receiving unit is configured to receive packet data, record the current RT, separate TDM data and the current ST, send the TDM data to the data sending unit, and send the current ST and the current RT to the determining unit; and
the data sending unit is configured to send the TDM data received from the data receiving unit according to the service clock acquired by the service clock acquiring unit.

13. A non-transitory computer-readable medium, having computer usable instructions stored thereon for execution by a processor to perform a method for improving clock stability, comprising:
determining whether a difference between a current sender timestamp (ST) and a current receiver timestamp (RT) is a mutated value, wherein a mutated value occurs when a value for the difference and an average value for the difference exceed a predetermined range but subsequent values of the difference and the average value for the subsequent values of the difference do not exceed the predetermined range;
replacing the difference between the current ST and the current RT with an average difference between ST and the RT, if the difference between the ST and RT is a mutated value;
computing a new average difference between ST and the RT according to the replaced difference between the current ST and the current RT; and
acquiring a service clock according to the current ST, the current RT and the new average difference between ST and the RT.

14. The computer-readable medium of claim 13, wherein the determining whether a difference between the current ST and the current RT is a mutated value comprises:
comparing an amplitude of a difference between the difference between the current ST and the current RT and an average difference between the ST and the RT with a predetermined range to determine whether the amplitude exceeds the predetermined range;
if the amplitude exceeds the predetermined range, detecting whether amplitudes of differences between subsequent N differences between the STs and the RTs and the average difference between the ST and the RT exceed the range; if the amplitudes of differences between the subsequent N differences between the STs and the RTs and the average difference between the ST and the RT do not exceed the predetermined range, determining that the difference between the current ST and the current RT is a mutated value.

15. The computer-readable medium of claim 13, wherein the acquiring a service clock according to the current ST, the current RT and the average difference between the ST and the RT:
determining an amplitude of a frequency difference between an output clock signal and a received clock signal according to the current ST, the current RT and the average difference between the ST and the RT;
performing filtering on the frequency difference between the output clock signal and the received clock signal;
performing an inversed phase modulation on the frequency of the output clock signal according to the frequency difference after the filtering;
locking the amplitude of the frequency difference between the clock signal and the received clock signal; and
recovering the service clock at the sending end.

16. The computer-readable medium of claim 13, wherein the acquiring a service clock according to the current ST, the current RT and the average difference between the ST and the RT comprises:
determining an amplitude of a phase difference between an output clock signal and a received clock signal according to the current ST, the current RT and the average receiver/sender timestamp difference;
performing filtering on the phase difference between the output clock signal and the received clock signal;
performing an inversed phase modulation on the phase of the output clock signal according to the phase difference after the filtering;
locking the amplitude of the phase difference between the clock signal and the received clock signal; and
recovering the service clock at the sending end.

* * * * *